United States Patent [19]

Pedersen et al.

[11] Patent Number: 4,940,106
[45] Date of Patent: Jul. 10, 1990

[54] ARTICULATED VEHICLE WITH HYDRAULIC STEERING

[75] Inventors: Harry E. Pedersen; Ole V. Sorensen, both of Nordborg, Denmark

[73] Assignee: Danfoss A/S, Nordborg, Denmark

[21] Appl. No.: 345,826

[22] Filed: May 1, 1989

[30] Foreign Application Priority Data

May 19, 1988 [DE] Fed. Rep. of Germany ....... 3817031

[51] Int. Cl.$^5$ .............................................. B62D 5/06
[52] U.S. Cl. .................................. 180/139; 180/134; 60/338
[58] Field of Search ............... 180/134, 135, 136, 137, 180/138, 139; 60/338

[56] References Cited

U.S. PATENT DOCUMENTS

| | | | |
|---|---|---|---|
| 3,260,325 | 7/1966 | Brown et al. | 180/139 |
| 3,566,749 | 3/1971 | Allen et al. | 180/139 |
| 4,019,603 | 4/1977 | Unruh et al. | 180/134 |
| 4,545,454 | 10/1985 | Bas | 180/139 |

Primary Examiner—Charles A. Marmor
Assistant Examiner—Alan M. Kagen
Attorney, Agent, or Firm—Wayne B. Easton

[57] ABSTRACT

A double acting hydraulic shock absorber is connected across first and second fluid conduits that are connected to opposite ends of hydraulic steering motors of an articulated vehicle and to a control unit that is controlled by a steering wheel to control the direction of movement of the vehicle. A pump provides pressurized fluid to the control unit. The shock absorber has a response pressure of a predetermined value and includes a piston in a tubular housing intermediate portion. A first shank is joined to the piston to abut against a first closure that closes one end of the housing to limit movement from the piston's datum position and a second shank joined to the piston to abut against a second closure that closes the opposite end of the housing to limit movement from the datum position toward the second closure. A pre-stressed spring, and abutment and stop members are provided on each shank whereby when the piston moves from its datum position toward one closure the spring between that closure and the piston is compressed while the other spring does not resiliently urge the piston toward the one closure.

16 Claims, 2 Drawing Sheets

ARTICULATED VEHICLE WITH HYDRAULIC STEERING

BACKGROUND AND FIELD OF THE INVENTION

The present invention relates to an articulated vehicle with hydraulic steering comprising a hydraulic control unit and a hydraulic steering motor connected to the control unit by two conduits.

In the control of articulated vehicles with hydraulic steering, situations can arise in which the driver and certain parts of the vehicle are subjected to uncomfortable side acceleration. A side acceleration exists at the start and end of every steering movement. The acceleration upon commencement of the steering movement is limited by the reaction period for the build up of pressure in the hydraulic system and by the inertia of the mechanical system. However, the position is different if a rapid steering movement is interrupted abruptly, say because the supply and withdrawal apertures of the cylinder are blocked or the steering is reversed. In this case, the front portion and the rear portion which are often of considerable mass are suddenly halted. Their momentum must, however, be somehow eliminated. Apart from the elasticity of the hydraulic elements, particularly the connecting conduits, and the relatively low compressibility of the hydraulic fluid, there is no energy store or eliminator available for taking up the energy and braking the movement. The moved masses and the elasticity of the hydraulic system now form an oscillating system in which the energy appears alternately as pressure and momentum. After a certain time, the oscillation dies down on account of friction and internal damping.

The driver, who is generally located near the pivot point, finds the oscillation to be uncomfortable. In addition, all mechanical connections and bearings suffer under the impact following oscillation.

It is therefore the problem of the present invention to provide an articulated vehicle with hydraulic steering offering improved driving and steering comfort.

This problem is solved in an articulated vehicle of the aforementioned kind in that parallel to the steering motor there is a double acting hydraulic shock absorber with a closed tubular housing connected at both ends to the two conduits by way of a respective passage and a piston which is movable longitudinally of the housing, disposed in the region of the middle of the housing and on both sides of which there is a respective spring prestressed by prestressing means which are connected to the piston and, on movement of the piston, permit only compression of the spring between the housing end and the piston but no expansion of the spring, the response pressure of the shock absorber having a predetermined value as a result of pre-stressing the springs.

In connection with an excavator boom, US-PS 28 01 013 discloses a double acting hydraulic shock absorber comprising a closed tubular housing which is connected at both ends by way of a respective passage to two hydraulic pressure conduits and a piston which is movable longitudinally of the housing and disposed in the region of the middle of the housing between two springs supported by the ends of the housing. In this shock absorber, the springs are clamped between the piston and the ends of the housing. When steering in one direction, the piston compresses one of the springs but allows the other spring to expand so that the available damping force is only the small difference between the two spring forces. Accordingly, the incorporation of this shock absorber in the steering system of an articulated vehicle with hydraulic steering fails in that the shock absorber would respond upon each steering movement. The result of this would be that even normal steering is made more difficult and a higher application of force would become necessary.

SUMMARY OF THE INVENTION

In the articulated vehicle according to the invention, the shock absorber responds only upon the existence of a particular pre-settable value. Normal steering is therefore not affected. It is only upon a strong pressure rise in one of the two said conduits of the steering system as a result of an abrupt change in the speed of movement that the piston is displaced in the shock absorber. The piston works against the force of a single spring without having to be assisted by the other spring. Upon termination of a steering movement, this leads to a gentle change in the speed of movement. The hydraulic fluid from the housing portion lying in the direction of movement is thereby compressed by the piston but remains in the system and builds up a pressure in the other conduit that acts against the pressure in the first conduit. This also effectively avoids cavitation. If the steering movement of the vehicle is interrupted abruptly, the resulting sideways movement of the driver's cabin is dumped by displacement of the piston in the shock absorber which improves the driving comfort.

In a preferred embodiment, the response pressure of the shock absorber is larger than a pressure required in the steering system during normal road travel. As a result, the shock absorber remains inoperative during normal road travel when no strong steering movements occur and begins to function only on operation of the articulated vehicle at the place of use where the stated forces could occur.

In a further preferred embodiment, piston movement limiting means are provided which limit the motion of the piston in both directions. This effectively takes up starting pressures occurring on an impact but it remains possible to execute a strong steering movement during which high pressures can occur for a prolonged period.

Advantageously, the piston movement limiting means are formed on both sides of the piston by a respective shank which points in the direction of movement of the piston, guides the spring and, in one end position of the piston, abuts against the associated end of the housing. This permits a particularly simple mounting of the shock absorber. After preassembling the springs and other components such as the sealing and bearing elements, the piston can be easily introduced in the housing.

It has proved advantageous for the limiting means to limit the volume of liquid compressible by the piston to 5 to 10% of the amount conveyed by the control unit per revolution of the steering wheel. This permits a steering behavior of the articulated vehicle that is comfortable for the average driver.

In another advantageous embodiment, the passage by which the shock absorber is connected to the two conduits comprises a throttle. This achieves additional damping. In conjunction with the associated spring, the maximum pressure is determined that is allowed to build up during a steering operation.

With particular advantage, the throttle is adjustable. In that case, the appropriate throttle size, that is to say the required damping, can be set depending on the nature of the vehicle in order to achieve a corresponding gentle steering behavior.

In a further preferred embodiment, the housing is closed at both ends by a respective closure member containing the passage, the throttle and a connection for one of the two conduits. The hydraulic fluid is in this case introduced in a bore already provided in the housing. Additional apertures in the housing that might give rise to problems are not necessary.

It is of particular advantage if the closure member comprises two connections which are interconnected and connected to the passage. This enables the shock absorber to be built subsequently into a steering system of an articulated vehicle without having to build additional T pieces into the conduits between the control unit and the steering motor. In addition, better cooling of the throttle is ensured.

In another preferred embodiment, at least one teflon ring is secured to the piston between the piston and the inside of the housing. The piston is in this way installed in the housing without too tight a fit and without lubricant.

For average articulated vehicles, a response pressure for the shock absorber of at least 8 bar has proved desirable. A particularly preferred operating range for the shock absorber is from a response pressure in the region of about 8 bar to a final pressure of about 20 bar upon abutment. Depending on the size of vehicle and the construction of the steering, however, other pressures can also be used.

BRIEF DESCRIPTION OF THE DRAWINGS

Preferred examples of the invention will now be described with reference to the drawing, wherein.

DETAILED DESCRIPTION OF THE INVENTION

Figure 1:
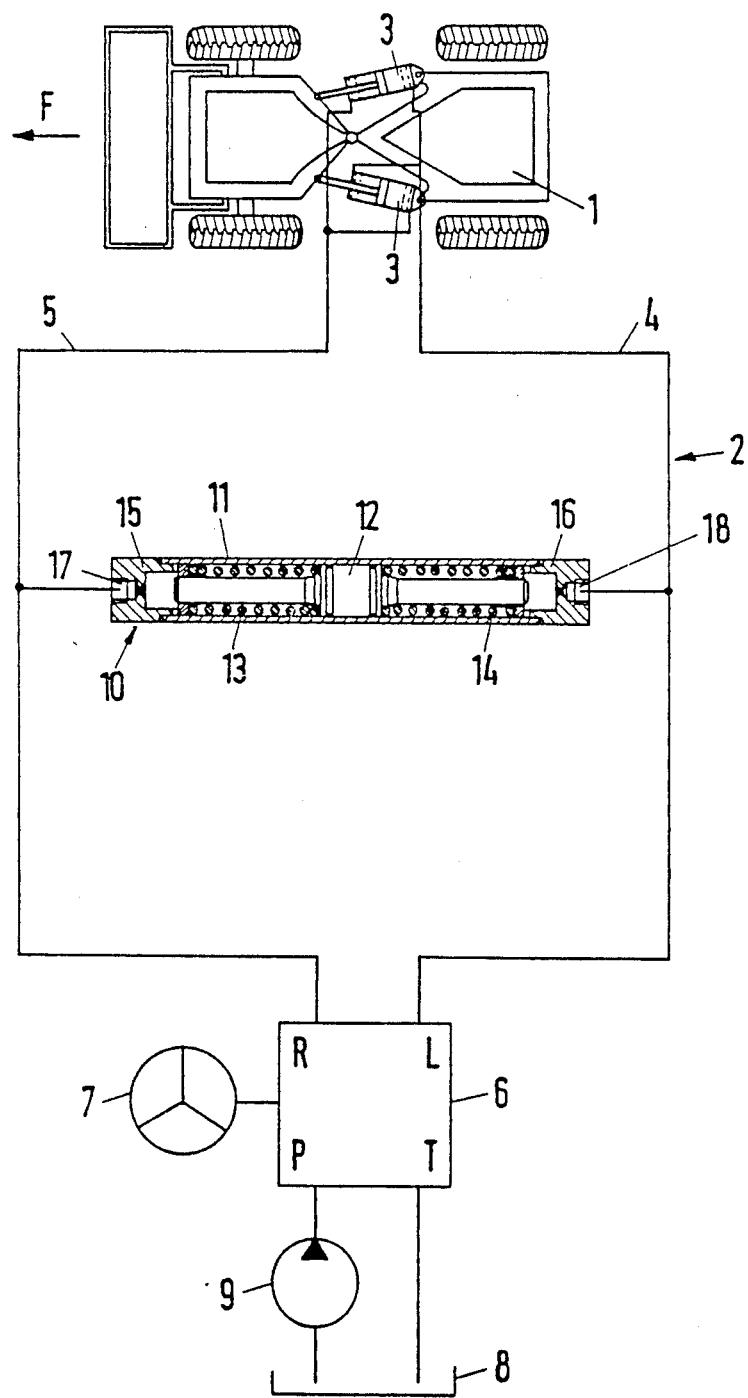
FIG. 1 is an outline diagram showing the principle of steering an articulated vehicle.

FIG. 1 shows an articulated vehicle 1 with a hydraulic steering system 2. The direction of travel of the vehicle 1 is given by the arrow F.

The steering system 2 comprises a steering motor 3 with two double acting piston-cylinder units, a control unit 6, two conduits 4, 5 by which the steering motor 3 is connected to the control unit 6, a steering wheel 7, a storage vessel 8 and a pump 9. A shock absorber 10 is arranged parallel to the steering motor 3 between the two conduits 4 and 5.

If, now, the steering wheel 7 is turned to the right, the pump 9 conveys oil by way of the connection P of the control unit 6 through the connection R into the conduit 5. In the steering motor 3, the oil displaces the upper piston to the right and the lower piston to the left, whereby the vehicle 1 is so articulated that it moves out of the direction F to the right. The oil compressed out of the steering motor 3 flows through the conduit 4 into the connection L of the control unit 6 and then by way of the connection T of the control unit 6 back to the storage vessel 8.

Figure 2:
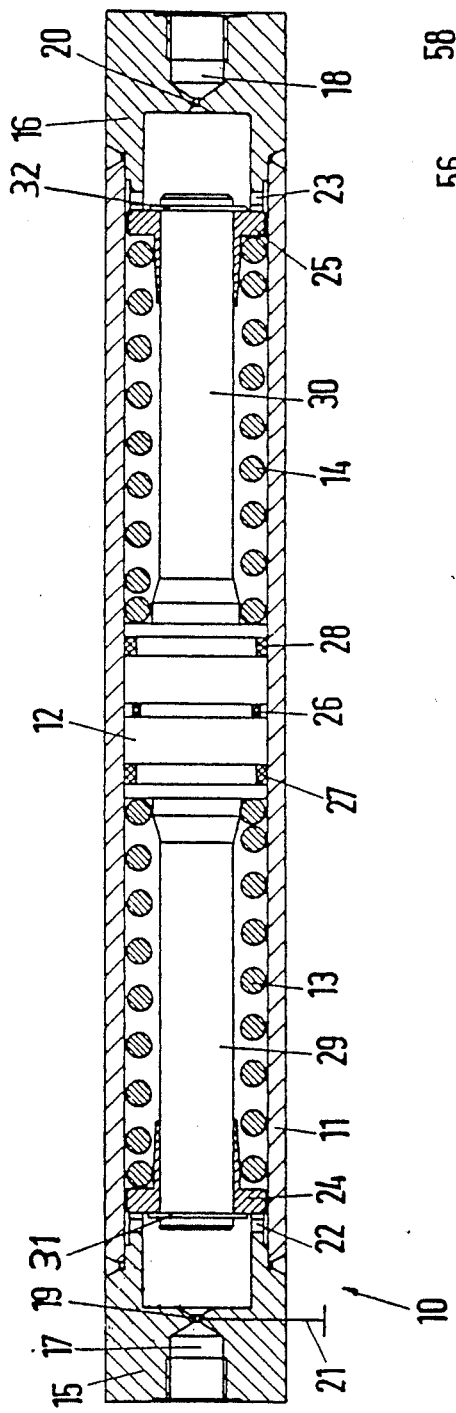
FIG. 2 illustrates a double acting hydraulic shock absorber.

The shock absorber 10, which is shown in FIG. 2 to an enlarged scale, comprises a tubular housing 11 which is closed at both ends by a respective closure member 15 and 16. A piston 12 is arranged in the middle of the housing 11.

The piston 12 has a sealing element 26 substantially in the middle and on both sides teflon rings 27, 28 in circumferential grooves. These teflon rings 27, 28 are provided in this position to mount the piston 12 with little friction and without too tight a fit without requiring lubrication for this bearing. On each side of the piston 12 there is a shank 29, 30 extending in the direction of movement of the piston. These shanks 29, 30 are displaceably mounted in spring abutments 24, 25 at the other end. In the respective end position of the piston, they abut against the particular closure member 15, 16 disposed in their direction. A split ring 31, 32 is mounted in a groove of the shank 29, 30 on the side of the spring abutment 24, 25 remote from the piston 12. This split ring 31, 32 limits the displacement of the spring abutment 24, 25 on the shank 29, 30 in the direction away from the piston 12.

Between the spring abutment 24, 25 and the piston 12, a respective spring 13, 14 is prestressed and guided by the shank 29, 30. This spring presses the spring abutment 24, 25 against the split ring 31, 32. The spacing of the end faces of the spring abutments 24, 25 remote from the piston is, in the rest position, equal to the internal length of the housing, i.e. the spacing between the two closure members 15, 16.

Each closure member 15, 16 comprises a passage 17, 18 communicating at one end with one of the two conduits 4, 5. At the other end of the passage 17, 18 there is a throttle 19, 20. The throttles 19, 20 may be adjustable. (For reasons of clarity, only one setting apparatus 21 is illustrated for the throttle 19.) Each closure member 15, 16 comprises apertures 22, 23 through which hydraulic oil that had entered through the conduits 4, 5, the passage 17, 18 and the throttle 19, 20 can reach the interior of the housing 11.

Figure 3:
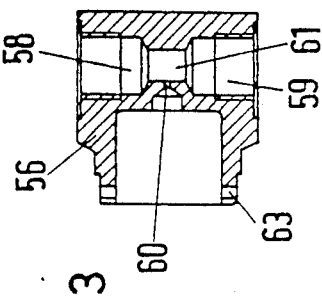
FIG. 3 shows a further embodiment of a closure member for the hydraulic shock absorber.

FIG. 3 shows a further embodiment of a closure member 56. This closure member comprises two connections 58, 59 for one of the two hydraulic conduits 4, 5 connected by a passage 61. Hydraulic oil from the passage 61 can flow into the interior of the housing 11 through a throttle 60 and apertures 63 which correspond to the apertures 22, 23 of the closure members 15, 16 in FIG. 2. By means of the closure member 56 shown in FIG. 3, one achieves better cooling of the throttle 60 because the transmission of heat from the throttle 60 to the main flow of hydraulic oil is better by reason of the short distance to the main flow of hydraulic oil. In addition, this closure member can be inserted directly into a conduit 4, 5 without the need for an additional T piece.

The function of the FIG. 1 steering system with shock absorber 10 will now be described. Upon slow steering movement to the right, a low pressure is exerted by the control unit 6 on the conduit 5. The system functions as hereinbefore described.

If, however, the pressure rises intensively as a result of a rapid steering movement so that it exceeds the pre-stressing of the spring 14, part of the oil conveyed by the pump 9 will flow from the control unit 6 by way of the conduit 5, the passage 17, the throttle 19 and the apertures 22 into the interior of the housing 11. It will thereby displace the piston 12 towards the right, which compresses the spring 14. The spring 13 remains in its prestressed condition between the piston 12 and spring abutment 24. It is moved to the right together with the shank 29 without having any effect. The amount of oil compressed by the piston 12 on its right-hand side is displaced by the control unit 6 to the tank 8 by way of the throttle 20, the passage 18 and the conduit 4. By reason of the limit of movement brought about by the shank 30, the amount of displaceable oil is limited to about 5 to 10% of that oil which is conveyed by the pump 9 per revolution of the steering wheel and which is allowed to pass by the control unit 6. However, this also depends on the size of the control unit 6 that is used.

The flow of the oil through the throttles 19 and 20 and the force of the spring 14 determine what pressure can be built up on the high pressure side of the steering motor and they thereby also determine the maximum possible acceleration of the steering movement as long as the piston has not yet reached the abutment.

Upon completion of the steering movement, both conduits 4 and 5 between the control unit 6 and steering motor 3 are blocked at the outlet of the control unit 16. This now gives rise to a pressure increase in the conduit 4, which brakes the steering movement. This pressure increase causes the same reaction at the shock absorber 10 as previously described but the piston 12 will now be displaced to the left. In contrast with the previously described operation, the amount of oil now displaced by the piston 12 will be fed to the low pressure side of the cylinder. The oil therefore remains in the steering system. In addition, a pressure opposite to the pressure on the high pressure side is relatively quickly built up on the low pressure side.

Upon steering to the left, the system works in an analogous manner with reverse directions of movement.

If, with a steering movement to the right, the vehicle meets an obstacle, the pressure in the conduit 5 increases abruptly. The piston 12 is displaced to the right by the oil and this achieves damping of the impact by the throttles 19 for the oil flowing into the shock absorber and 20 for the oil flowing out and damping for the force of the spring 14. The oil displaced into the conduit 4 returns to the tank through the control unit 6.

With a steering movement to the left, an abrupt interruption in the movement gives rise to a pressure increase in the conduit 4 with the corresponding piston movement in the other direction.

The momentum is therefore released at the shock absorber in the form of heat which, for the most part, is formed in the throttles and to a small extent in the springs. The braking effect is greatest upon commencement of the retardation, when the speed is the highest, and gradually decreases as the speed decreases. It is therefore possible to achieve gentle braking with the aid of an appropriate size of aperture.

In the rest condition, the spring 13 or 14 returns the piston 12 to its central position.

The spring force is preferably chosen so that the piston remains in its central position during normal pressure conditions which obtain during operation on a level road with slight steering corrections.

We claim:

1. An articulated vehicle steerable in a first direction and an opposite second direction comprising a first and a second conduit that each have first and second end portions respectively, a hydraulic steering motor connected between the first ends of the first and second conduits, a control unit connected between the second ends of the first and second conduits that is operable for controlling the flow of pressurized fluid through the first and second conduit respectively, a pump for providing pressurized fluid to the control unit, a steering wheel operable in two directions for operating the control unit, and a double acting hydraulic shock absorber that has a response pressure of a predetermined value, the shock absorber including a longitudinally elongated tubular housing having a first end portion, a second end portion and an intermediate portion, first closure means for closing the first end portion of the housing and fluidly connecting the housing first end portion to the first conduit, second closure means for closing the second end portion of the housing and fluidly connecting the housing second end portion to the second conduit, a piston disposed in a datum position in the intermediate portion of the housing and being longitudinally movable away from the datum position toward each of the housing end portions with the direction of longitudinal movement depending upon the fluid pressure in the housing, the piston having a first end facing toward the housing first end portion and a second end facing toward the housing second end portion, first pre-stressing means acting between the piston first end and the first closure means for constantly resiliently urging the piston toward the second closure means only when the piston has been moved away from the datum position toward the housing first end portion by fluid pressure at the second closure means that is at least a preselected amount higher than that at the first closure means and the piston is between its datum position and the first closure means, and second pre-stressing means acting between the piston second end and the second closure means for constantly resiliently urging the piston toward the first closure means only when the piston has been moved away from the datum position toward the housing second end portion by fluid pressure at the first closure means that is at least a preselected amount higher than that at the second closure means and the piston is between its datum position and the second closure means.

2. An articulated vehicle according to claim 1, characterized in that the shock absorber has a response pressure that is larger than the pressure required in steering the vehicle during normal road travel.

3. An articulated vehicle according to claim 2, characterized in that the shock absorber pressure is at least 8 bar.

4. An articulated vehicle according to claim 1, characterized in that the first closure means has means defining a fluid passage that one end opening to the first conduit and a second end opening to the housing first end portion for placing the first conduit in fluid communication with the housing first end portion and a throttle that defines a part of the passage.

5. An articulated vehicle according to claim 4, characterized that the means defining the first fluid passage includes a fluid connection opening to the first conduit and to the first throttle opposite the first throttle from the housing and that the second closure means includes means defining a second fluid passage that has one end opening to the second conduit and a second end opening to the housing second end portion, a second throttle and a fluid connection to the second conduit opposite the second throttle from the housing second end portion.

6. An articulated vehicle according to claim 5 characterized in that the means defining the second passage connection includes a first connection portion and a second connection portion, the connection portions defining a part of the second fluid conduit to allow the fluid through the second closure means.

7. An articulated vehicle according to claim 1, characterized in that the first pre-stressing means includes a first longitudinally elongated shank having one end fixedly joined to the piston to move therewith between at least a datum position and a second position to limit the movement of the piston toward the first closure means, and an opposite end, a first coil spring having one end abuttable against the piston and an opposite end more closely adjacent to the first closure means than the piston, a stop member mounted by the first shank opposite end in a fixed position relative thereto, and an abuttable member mounted on the shank longitudinally between the stop member and the spring for abutting against the stop member and the spring opposite end and being longitudinally movable on the shank for compressing the spring as the piston is moved from its datum position toward the first closure means.

8. An articulated vehicle according to claim 7, characterized in that at least one of the first closure means and the housing first end portion has limit means for limiting the movement of the abuttable member in a direction away from the second closure means while permitting the first shank moving away from the second closure means when the limit means abuts against the abuttable member and the shank and piston move from their datum position toward the first closure means.

9. An articulated vehicle according to claim 8, characterized in that the spring is pre-stressed to avoid resiliently urging the piston toward the second closure means when the shank is in its datum position and the abutment member abuts against the stop member and that the spring is compressed as the piston is moved from its datum position toward the first closure means.

10. An articulated vehicle according to claim 8, characterized in that the first closure means has means defining a fluid passage that has one end opening to the first conduit and a second end opening to the housing first end portion for placing the first conduit in fluid communication with the abuttable member and a throttle that defines a part of the passage.

11. An articulated vehicle according to claim 7, characterized in that the first pre-stressing means includes first limit means for limiting the maximum movement of the piston in a longitudinal direction toward the first closure means and the second pre-stressing means includes second limit means for limiting the maximum movement of the piston in a longitudinal direction toward the second closure means.

12. An articulated vehicle according to claim 11 wherein the steering wheel is rotatable, fluid is conducted by the control unit as the steering wheel is rotated and that fluid is displaceable in the housing by movement of the piston in either longitudinal direction, characterized in that the first and second limit means have means for limiting the volume of fluid displace in the housing to about 5 to 10% of the amount conducted by the control unit per revolution of the steering wheel.

13. An articulated vehicle according to claim 11 wherein each of the limit means is abuttable against the adjacent closure means, characterized in that the fluid pressure in the housing when one of the limit means abuts against the adjacent closure means is about 20 bar.

14. An articulated vehicle according to claim 11, characterized in that the first limit means includes a longitudinally elongated first shank having one end fixedly joined to the piston to move therewith and an opposite end abuttable against the first closure means for limiting the movement of the piston in the direction toward the first closure means and that the second limit means includes a longitudinally elongated second shank having one end fixedly joined the piston to move therewith and an opposite end abuttable against the second closure means for limiting the movement of the piston in the direction toward the second closure means.

15. An articulated vehicle according to claim 11, characterized in that the first limit means includes a longitudinally elongated first shank having one end fixedly joined to the piston to move therewith and an opposite end abuttable against the first closure means for limiting the movement of the piston in the direction toward the first closure means and that the second limit means includes a longitudinally elongated second shank having one end fixedly joined the piston to move therewith and an opposite end abuttable against the second closure means for limiting the movement of the piston in the direction toward the second closure means.

16. An articulated vehicle steerable in a first direction and an opposite second direction comprising a first and a second conduit that each have first and second end portions respectively, a hydraulic steering motor connected between the first ends of the first and second conduits, a control unit connected between the second ends of the first and second conduits and is operable for controlling the flow of pressurized fluid through the first and second conduit respectively, a pump for providing pressurized fluid to the control unit, a steering wheel operable in two directions for operating the control unit, and a double acting hydraulic shock absorber that has a response pressure of a predetermined value, the shock absorber including a longitudinally elongated tubular housing having a first end portion, a second end portion and an intermediate portion, first closure means for closing the first end portion of the housing and fluidly connecting the housing first end portion to the first conduit, second closure means for closing the second end portion of the housing and fluidly connecting the housing second end portion to the second conduit, a piston disposed in a datum position in the intermediate portion of the housing and being longitudinally movable away from the datum position toward each of the housing end portions with the direction of longitudinal movement depending upon the fluid pressure in the housing, the piston having a first end facing toward the housing first end portion and a second end facing toward the housing second end portion, a first shank having a first end joined to the piston first end and a second end that is abuttable against the first closure means to limit the movement of the piston in a direction toward the first closure means, a second shank having a first end joined to the piston second end and a second end that is abuttable against the second closure means to limit the movement of the piston in a direction toward the second closure means, a prestressed spring on the first shank and having one end abuttable against the piston first end and a second end, and a prestressed second spring on the second shank that has a first end abuttable against the piston second end and a second end, first abutment means mounted on the first shank second end for compressing the first spring when the piston moves from its datum position towards the first closure means to urge the piston towards its datum position while leaving the first spring in a non-compressed condition when the piston is moving from its datum position toward the second closure means, and second abutment means mounted on the second shank second end for compressing the second spring when the piston moves from its datum position toward the second closure means to urge the piston towards its datum position while leaving the second spring in a non-compressed condition when the piston is moving from its datum position toward the first closure means.

* * * * *